United States Patent
Ryu

(10) Patent No.: US 8,624,196 B2
(45) Date of Patent: Jan. 7, 2014

(54) X-RAY DETECTOR AND DRIVING METHOD THEREOF

(75) Inventor: Jea-Eun Ryu, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 216 days.

(21) Appl. No.: 13/303,974

(22) Filed: Nov. 23, 2011

(65) Prior Publication Data

US 2012/0161020 A1    Jun. 28, 2012

(30) Foreign Application Priority Data

Dec. 28, 2010 (KR) ......................... 10-2010-0137219

(51) Int. Cl.
*G01T 1/24* (2006.01)
(52) U.S. Cl.
USPC .................................................. 250/370.09
(58) Field of Classification Search
USPC .................................................. 250/370.09
See application file for complete search history.

(56) References Cited

U.S. PATENT DOCUMENTS

| 6,185,274 B1 | 2/2001 | Kinno et al. |
| 6,856,351 B1 | 2/2005 | Weisfield |
| 7,532,706 B2 * | 5/2009 | Kameshima et al. ........... 378/98 |

FOREIGN PATENT DOCUMENTS

| JP | 11-331703 | 11/1999 |
| JP | 2007-282684 | 11/2007 |

* cited by examiner

*Primary Examiner* — David Porta
*Assistant Examiner* — Hugh H Maupin
(74) *Attorney, Agent, or Firm* — Robert E. Bushnell, Esq.

(57) ABSTRACT

An X-ray detector and a method of driving the X-ray detector. Each of a plurality of light sensing pixels of the X-ray detector includes: a photodiode which generates an electric detection signal corresponding to an emitted X-ray in an X-ray detection section; a first switching device which transmits the electric detection signal to the outside; a second switching device which applies a voltage for making both ends of the photodiode equipotential to a node to which the photodiode and the first switching device are connected, in an idle section; and a third switching device which applies a voltage for maintaining a constant potential difference at the both ends of the photodiode to the node in the idle section.

16 Claims, 4 Drawing Sheets

X-RAY DETECTOR AND DRIVING METHOD THEREOF

CROSS REFERENCE TO RELATED APPLICATIONS

This application makes reference to, incorporates the same herein, and claims all benefits accruing under 35 U.S.C §119 from an application entitled earlier filed in the Korean Intellectual Property Office on 28 Dec. 2010, which was duly assigned Serial No. 10-2010-0137219 by that Office.

BACKGROUND OF THE INVENTION

1. Field of the Invention

The present invention relates to an X-ray detector and a driving method thereof.

2. Description of the Related Art

In general, an X-ray easily passes through a subject on a short wavelength. A transmitted amount of the X-ray is determined according to a density of the object. In other words, an internal state of the subject is indirectly observed through the transmitted amount of the X-ray which has passed through the subject.

An X-ray detector refers to an apparatus which detects the transmitted amount of the X-ray which has passed through the subject. The X-ray detector detects the transmitted amount of the X-ray to display the internal state of the subject through a display device to the outside. The X-ray detector may be generally used as a medical examination device, a nondestructive examination device, or the like.

A flat panel digital radiography (DR) method using a DR method not using a film as an X-ray detector has been widely used.

SUMMARY OF THE INVENTION

The present invention provides an X-ray detector capable of restricting a deterioration of characteristics of a photodiode due to material characteristics of amorphous silicon and a driving method thereof.

According to an aspect of the present invention, there is provided an X-ray detector including a plurality of light sensing pixels, wherein each of the plurality of light sensing pixels includes: a photodiode (PD) which generates an electric detection signal corresponding to an emitted X-ray in an X-ray detection section; a first switching device which transmits the electric detection signal to the outside; and a second switching device which applies a voltage for making both ends of the photodiode equipotential to a node to which the photodiode and the first switching device are connected, in an idle section between two X-ray detection sections.

The photodiode may include a first electrode which is electrically connected to the first switching device and a second electrode which is electrically connected to a bias line which applies a bias voltage.

The first switching device may include a gate electrode which is electrically connected to a gate line, a first electrode which is electrically connected to the photodiode, and a second electrode which is electrically connected to a data line.

The second switching device may include a gate electrode which is electrically connected to a first voltage line which applies a first voltage for turning on the second switching device, a first electrode which is electrically connected to a second voltage line which applies a voltage having the same level as the bias voltage, and a second electrode which is electrically connected to the node.

The X-ray detector may further include a third switching device which applies a voltage for maintaining a constant potential difference at both ends of the photodiode to the node, in the idle section between the two X-ray detection section.

The third switching device may include a gate electrode which is electrically connected to a third voltage line which applies a third voltage for turning on the third switching device, a first electrode which is electrically connected to a fourth voltage line which applies a fourth voltage for applying a reverse bias to the photodiode, and a second electrode which is electrically connected to the node.

According to another aspect of the present invention, there is provided an X-ray detector including: a panel which includes light sensing pixels arrayed in a matrix form, wherein each of the light sensing pixels includes a photodiode which generates an electric detection signal corresponding to an emitted X-ray in an X-ray detection section and a first switching which transmits the electric detection signal to the outside; a gate driver which applies a gate signal for turning on the first switching device to a gate line; and a second switching device which applies a voltage having the same level as a bias voltage applied to an other electrode of the photodiode, to a node to which an electrode of the photodiode and the first switching device are connected, in an idle section between two X-ray detection sections.

The second switching device may be installed in each of the light sensing pixels.

The X-ray detector may further include a third switching device which applies a voltage for maintaining a constant potential difference at both ends of the photodiode, to the node in the idle section between the two X-ray detection sections.

The third switching device may be installed in each of the light sensing pixels.

According to another aspect of the present invention, there is provided a method of driving an X-ray detector including a plurality of light sensing pixels, each of which includes a photodiode for generating an electric detection signal corresponding to an emitted X-ray and a first switching device for transmitting the electric detection signal to the outside, including: turning on the first switching device to transmit the electric detection signal to the outside in an X-ray detection section; and applying a voltage for making both ends of the photodiode equipotential to a node to which the photodiode and the first switching device are connected, in an idle section between two X-ray detection sections.

The voltage for making the both ends of the photodiode equipotential may be applied by a second switching device which includes a first electrode which is electrically connected to a second voltage line which applies a voltage having the same level as the bias voltage and a second electrode which is electrically connected to the node.

The voltage for maintaining the constant potential different at the both ends of the photodiode may be applied by a third switching device which comprises a first electrode which is electrically connected to a fourth voltage line which applies a fourth voltage for applying a reverse bias to the photodiode and a second electrode which is electrically connected to the node.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
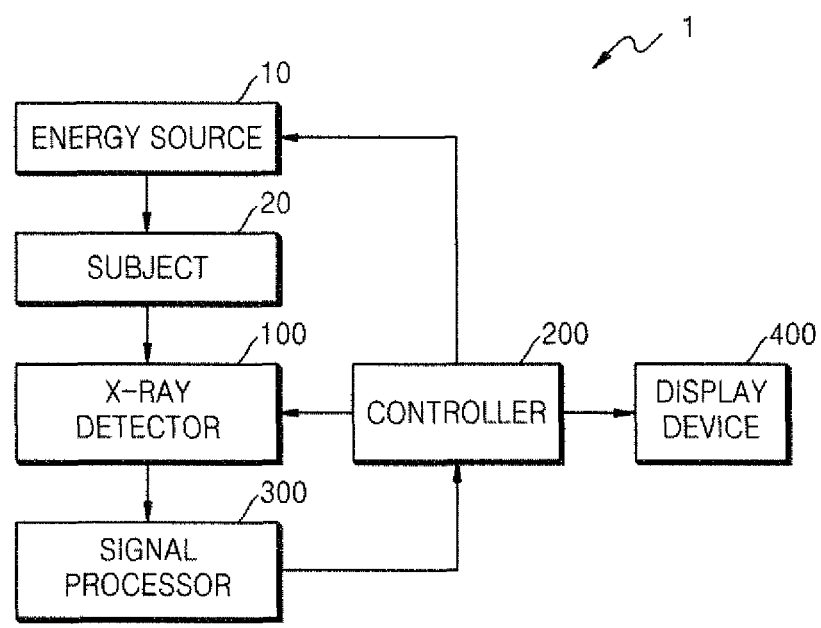
FIG. 1 is a schematic block diagram of an X-ray detecting system according to an embodiment of the present invention.

The present invention will now be described more fully with reference to the accompanying drawings, in which exemplary embodiments of the invention are shown. Like reference numerals in the drawings denote like elements. In the description of the present invention, if it is determined that a detailed description of commonly-used technologies or structures related to the invention may unnecessarily obscure the subject matter of the invention, the detailed description will be omitted. In the drawings, the thicknesses of layers and regions are exaggerated for clarity.

FIG. 1 is a schematic block diagram of an X-ray detecting system 1 according to an embodiment of the present invention.

Referring to FIG. 1, the X-ray detecting system 1 includes an energy source 10, an X-ray detector 100, a controller 200, a signal processor 300, and a display device 400.

The energy source 10 is a radiation emitter which emits radiation, such as an X-ray or the like, onto a subject 20.

The X-ray detector 100 includes a plurality of light sensing pixels for sensing X-rays in a flat panel. The X-ray detector 100 includes a plurality of photodiodes (PDs) and a plurality of switching devices which detect a transmitted amount of the X-ray. If the X-ray is applied to the photodiodes when a reverse bias is applied to the photodiodes, an electric signal corresponding to the transmitted amount of the X-ray is generated in each of the photodiodes. The electric signal is read out through a data line and then input into a readout integrated circuit (IC)

The controller 200 controls operations of the energy source 10, the X-ray detector 100, and the display device 400 to form an X-ray image which has been offset-corrected. The controller 200 controls a time when the energy source 10 is to emit the X-ray and a time for which the X-ray detector 100 is to detect the X-ray.

The signal processor 300 converts the electric signal output from the X-ray detector 100 into a digital signal. The signal processor 300 generates an offset image and an X-ray image from the digital signal. The offset image may be updated by averaging a previously generated offset image and a currently generated offset image. The signal processor 300 subtracts an offset image, which has been generated before the X-ray is emitted, from the X-ray image to generate an X-ray image which has been offset-corrected.

The display device 400 displays the X-ray image which has been offset-corrected. The display device 400 may be a liquid crystal display (LCD), an organic light-emitting diode display, a plasma display device, or the like.

Figure 2:
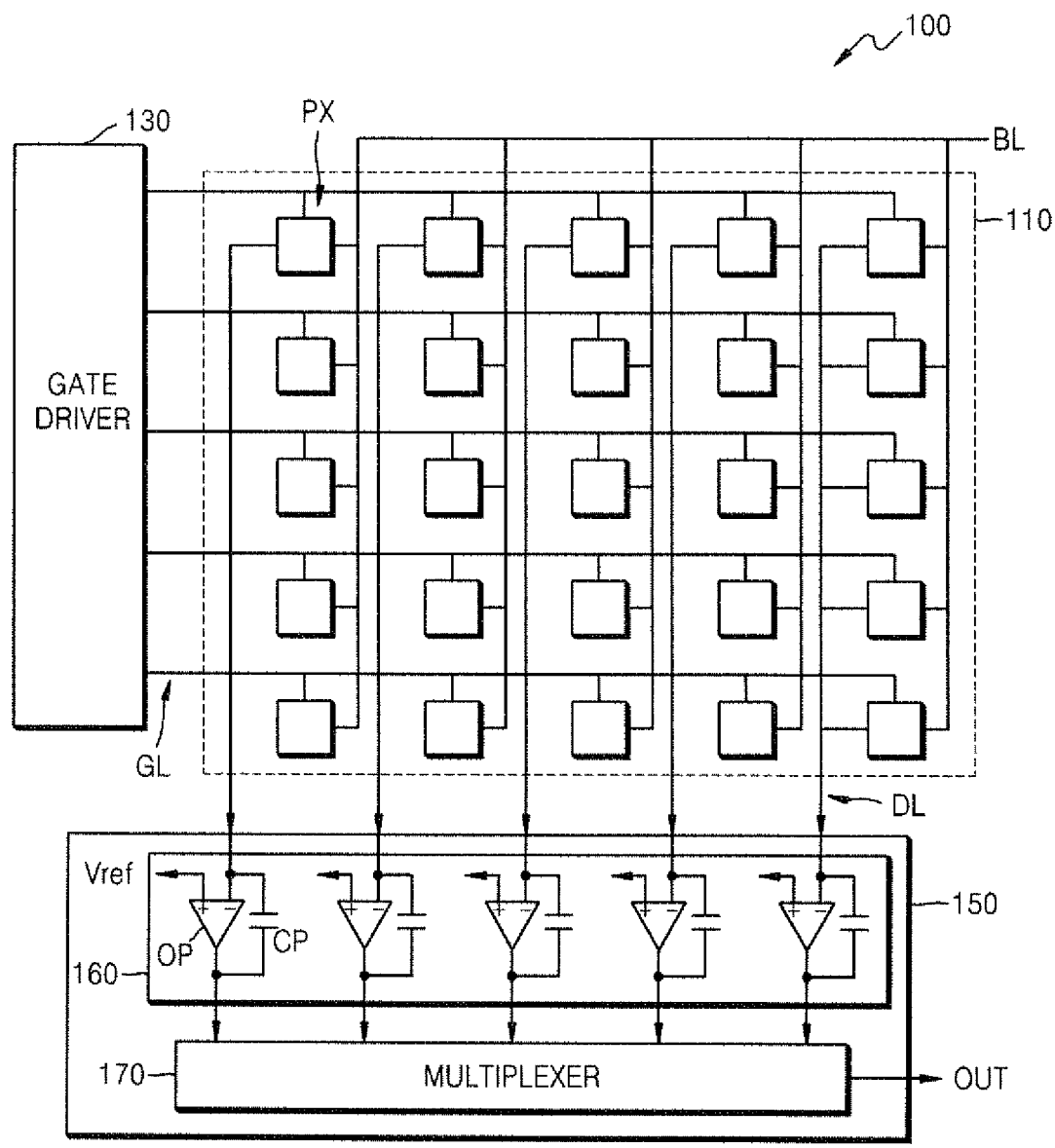
FIG. 2 is a schematic circuit diagram of an X-ray detector according to an embodiment of the present invention.

FIG. 2 is a schematic circuit diagram of an X-ray detector 100 according to an embodiment of the present invention.

Referring to FIG. 2, the X-ray detector 100 includes a panel 110, a gate driver 130, and a readout IC 150.

The panel 110 senses the X-ray emitted from the energy source 100, converts a sensed signal into an electric signal through a photoelectric transformation, and outputs the electric signal. The panel 110 includes a plurality of light sensing pixels PX, which are arrayed in a matrix form, a plurality of gate lines GL and a plurality of data lines DL. The plurality of gate lines GL are arrayed to be orthogonal to the plurality of data lines DL. In FIG. 2, 20 light sensing pixels PX are exemplarily arrayed in 5 columns and 5 rows, but the present invention is not limited thereto.

Each of the light sensing pixels PX includes a photodiode (not shown), which senses an X-ray and outputs an electric signal (e.g., a photo-detection voltage), and a transistor (not shown) which switches the electric signal output from the photodiode.

The photodiodes are amorphous silicon (a-Si) PIN photodiodes which receive visible rays. The X-ray detector 100 applies a reverse bias to both ends of each of the photodiodes to use the a-Si PIN photodiodes as light-receiving devices. However, when the reverse bias is applied to the photodiodes for a long time, diode characteristics degraded according to material characteristics of amorphous silicon (a-Si).

In order to solve the degradation of the diode characteristics, both ends of a conventional photodiode are made equipotential using a method of turning on an electroluminance (EL) sheet before the conventional photodiode receives light (Optical Flashing Method). However, if the EL sheet is inserted, the EL sheet requires a time to sufficiently make both ends of the photodiode equipotential. Also, a capacitance of the photodiode is filled with external light, not with an electric signal. In this case, a load is applied to the photodiode by the capacitance.

Before a photodiode receives light, i.e., although the photodiode is degraded in an idle section, an X-ray detector not using an EL sheet continuously applies a reverse bias to the photodiode (Scrubbing Method). In this case, if the reverse bias is continuously applied to the photodiode, characteristics of the photodiode are degraded, thereby shortening a lifespan of the photodiode.

Accordingly, an equipotential voltage is formed by an electric signal at a photodiode in an idle section without giving a simulation such as external light using an EL sheet. Also, transistors are added so that a reverse bias is not excessively applied to the photodiode so as not to give stress. This will be described in more detail later.

The gate driver 130 sequentially applies gate voltages to the plurality of gate lines GL. If the gate signals are applied to the gate lines GL, the transistors are turned on. If the gate signals are not applied to the gate lines GL, the transistors are turned off.

If the transistors are turned on, the electric signal provided from the photodiodes is output to the readout IC 150 through the data lines DL. The gate driver 130 may be formed in an IC form to be installed on a side of the panel 110 or may be directly formed through a thin film process.

The readout IC 150 includes a signal detector 160 and a multiplexer 170.

The signal detector 160 includes a plurality of amplifiers which correspond to the plurality of data lines DL one-by-one, and each of the amplifiers includes an operational amplifier OP and a capacitor CP.

The operational amplifiers OP include input ports connected to the data lines DL, second input ports receiving reference voltages Vref, and output ports. The reference voltages Vref may be ground voltages 0V. The first input ports may be negative terminals of the operational amplifiers OP, and the second input ports may be positive terminals of the operational amplifiers OP. The output ports are connected to the multiplexer 170.

Ends of the capacitors CP are electrically connected between the first input ports and the output ports of the operational amplifiers OP.

The multiplexer 170 receives voltage signals from the operational amplifiers OP of the signal detector 160 and sequentially outputs the voltage signals to the signal processor 300. The multiplexer 170 includes switches which respectively correspond to the amplifiers OP.

The voltage signals output from the multiplexer 170 are input into the signal processor 300. The signal processor 300 includes a control circuit (not shown) which converts the voltage signals into image signals and provides the image signals to the display device 400 via controller 200. Therefore, an image captured by the X-ray detector 100 is displayed on the display device 400.

Figure 3:
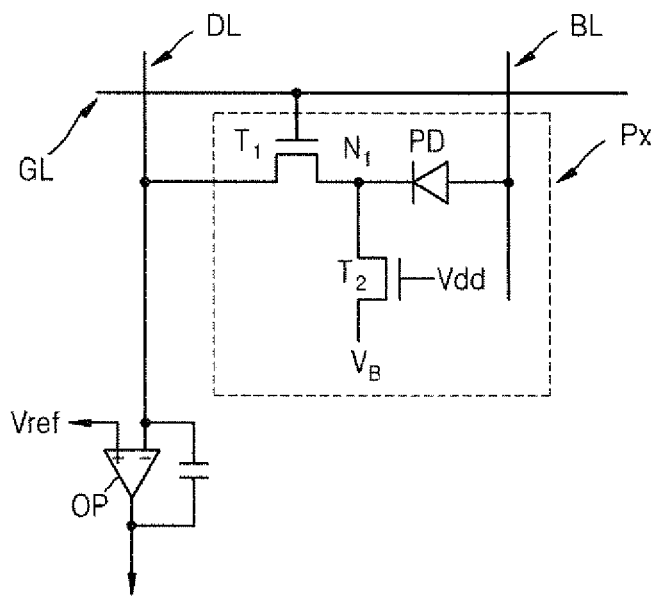
FIG. 3 illustrates an internal circuit of a pixel of an X-ray detector panel according to an embodiment of the present invention.

FIG. 3 illustrates an internal circuit of a pixel of X-ray detector panel 110 according to an embodiment of the present invention.

Referring to FIG. 3, a pixel PX includes a photodiode PD, a first transistor T1, and a second transistor T2.

The photodiode PD senses an incident X-ray, converts the sensed signal into an electric signal through a photoelectric transformation, and outputs the electric signal. The photodiode PD may be a PIN diode. A first electrode of the photodiode PD is electrically connected to the first transistor T1 via a node N1, and a second electrode of the photodiode PD is electrically connected to a bias line BL which applies a bias voltage.

The first transistor T1 is a switching device which transmits the electric signal output from the photodiode PD to the outside in an X-ray detection section. A gate electrode of the first transistor T1 is electrically connected to a gate line GL, a first electrode (a drain electrode or a source electrode) of the first transistor T1 is electrically connected to the first electrode of the photodiode PD via node N1, and a second electrode (a source electrode or a drain electrode) of the first transistor T1 is electrically connected to a corresponding operational amplifier OP of the readout IC 150 through a data line DL.

The second transistor T2 is a switching device which makes both ends of the photodiode equipotential in an idle section between two X-ray detection sections. A gate electrode of the second transistor T2 is electrically connected to a first voltage line (not shown) which applies a first voltage Vdd. A first electrode (a drain electrode or a source electrode) of the second transistor T2 is electrically connected to a second voltage line (not shown) which applies a second voltage $V_B$. The second voltage $V_B$ has the same level (intensity) as the bias voltage applied to the bias line BL. A second electrode (a source electrode or a drain electrode) of the second transistor T2 is electrically connected to the node N1. The first voltage line may be a gate line GL, and the second voltage line may be a bias line BL.

The second transistor T2 removes a potential with which the node N1 is charged so that a previous signal and a next signal are not mixed, in order to remove an image lag and an afterimage. In the idle section, the bias voltage is applied to the second electrode of the photodiode PD, and the first voltage Vdd is applied to the gate electrode of the second transistor T2. The second transistor T2 is turned on to apply the second voltage $V_B$ through the first electrode. Therefore, the second voltage $V_B$ having the same level as the bias voltage is applied to the node N1, and the both ends of the photodiode PD are equipotential.

According to another embodiment of the present invention, a fourth voltage line (not shown) and a second voltage line (not shown) may be selectively connected to the first electrode of the second transistor T2. The fourth voltage $V_R$ for applying a reverse bias may be applied to the fourth voltage line in order to maintain an appropriate bias potential difference at both ends of the PD. In this case, a turn-on operation of the second transistor T2 for making the PD equipotential to remove an image lag and an afterimage and a turn-on operation of the third transistor T3 for maintaining a potential difference of the PD are sequentially performed in the idle section. Thus, a second voltage line is previously connected to the first electrode of the second transistor T2 so that the second voltage $V_B$ having the same level as the bias voltage may be applied to the first node N1. Then, a fourth voltage line is connected to the first electrode of the second transistor T2 so that the fourth voltage $V_R$ may be applied to the first node N1.

Figure 4:
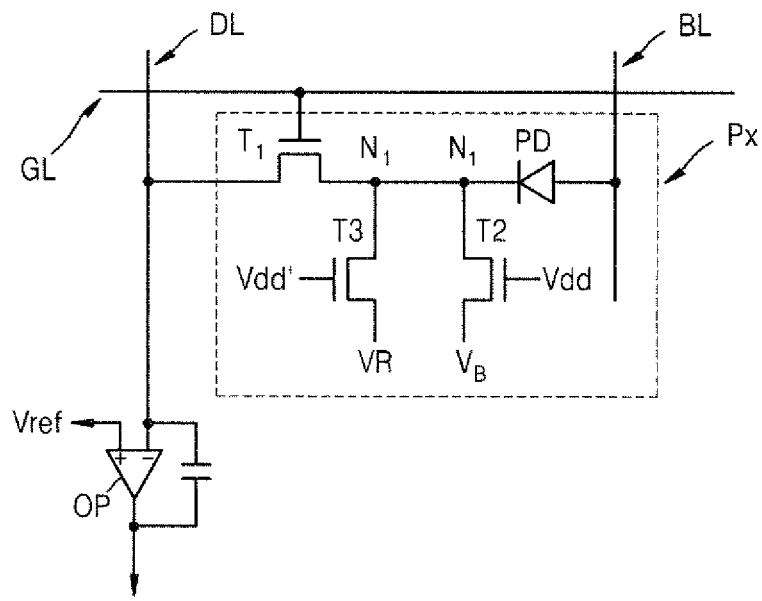
FIG. 4 is an internal circuit of a pixel of an X-ray detector panel according to another embodiment of the present invention.

FIG. 4 is an internal circuit of a pixel of an X-ray detector panel according to another embodiment of the present invention.

Referring to FIG. 4, a pixel PX includes a photodiode PD, a first transistor T1, a second transistor T2, and a third transistor T3.

The present embodiment is different from the previous embodiment of FIG. 3 in that the third transistor T3 is added. Other elements of the present embodiment are the same as those of the previous embodiment, and thus their detailed descriptions will be omitted.

The third transistor T3 is a switching device which maintains an appropriate bias potential at both ends of the photodiode PD in an idle section of two X-ray detection sections. The third transistor T3 is installed in each light sensing pixel PX. A gate electrode of the third transistor T3 is electrically connected to a third voltage line (not shown) which applies a third voltage Vdd'. A first electrode (a drain electrode or a source electrode) of the third transistor T3 is electrically connected to a fourth voltage line (not shown) which applies a fourth voltage $V_R$. The fourth voltage $V_R$ is a voltage for applying a reverse bias to the photodiode PD. A second electrode (a source electrode or a drain electrode) of the third transistor T3 is electrically connected to node N1. A first electrode of the first transistor T1, a first electrode of the photodiode PD, and the second electrode of the second transistor T2 are connected to node N1. The third voltage line may be a gate line GL.

A turn-on operation of the second transistor T2 for making the photodiode PD equipotential to remove an image lag and an afterimage and a turn-on operation of the third transistor T3 for maintaining a potential difference of the photodiode PD are sequentially performed in the idle section.

A bias voltage is applied to a second electrode of the photodiode PD, and a first voltage Vdd is applied to a gate electrode of the second transistor T2. The second transistor T2 is turned on, and a second voltage $V_B$ having the same level as the bias voltage is applied to node N1. Therefore, both ends of the photodiode PD are equipotential, and an image lag and an afterimage are removed.

The third voltage Vdd' is applied to the gate electrode of the third transistor T3. The third transistor T3 is turned on, and the fourth voltage $V_R$ is applied to node N1. Therefore, a reverse bias is applied to the photodiode PD, and thus a constant potential difference is maintained at the both ends of the photodiode PD.

Figure 5:
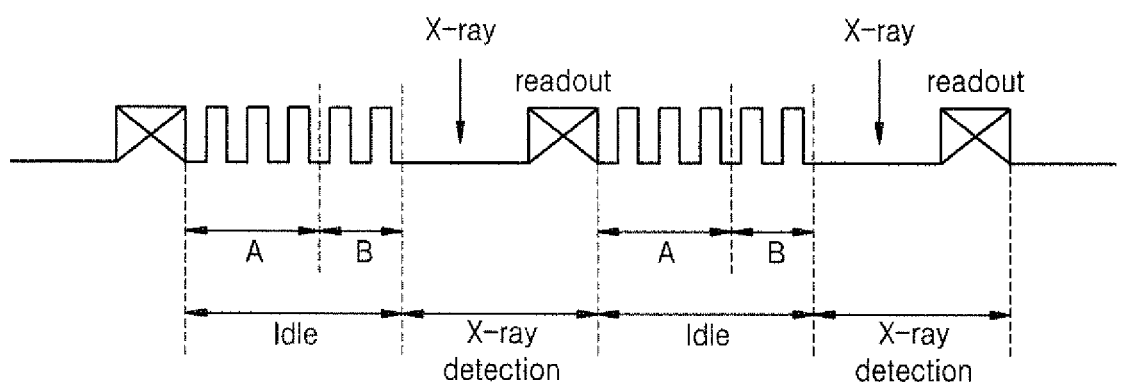
FIG. 5 is a timing diagram for describing a method of generating an X-ray image, according to an embodiment of the present invention.

FIG. 5 is a timing diagram for describing a method of generating an X-ray image, according to an embodiment of the present invention.

Referring to FIG. 5, a driving period for capturing an X-ray image of one frame includes an idle section and an X-ray detection section.

The idle section may include a section A in which the second voltage $V_B$ having the same level as the bias voltage is applied through the second transistor T2 to make both ends of the PD equipotential, and a section B in which the fourth voltage $V_R$ that is a reverse bias is applied through the second transistor T2 or the third transistor T3 to maintain a constant potential difference between both ends of the PD. Prior to applying the fourth voltage $V_R$, a signal for requesting to apply the fourth voltage $V_R$ may be output from an X-ray detector.

The X-ray detection section may include an X-ray emission section and an X-ray readout section for reading out an electric signal that is generated in the PD by emitting an X-ray.

As described above, a voltage having the same level is applied as an electrical signal to a photodiode PD, instead of an EL sheet for emitting light to the outside to thus reduce costs and the number of processes for inserting the EL sheet.

In addition, a switching device for applying a voltage having the same level to a photodiode, and a switching device for stably providing a reverse bias to the photodiode are further used in addition to a switching device for transferring a signal in a photosensing pixel to thus restrict a deterioration of characteristics of the photodiode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An X-ray detector comprising a plurality of light sensing pixels, wherein each of the plurality of light sensing pixels comprises:
    a photodiode which generates an electric detection signal corresponding to an emitted X-ray in an X-ray detection section;
    a first switching device which transmits the electric detection signal to the outside; and
    a second switching device which applies a voltage for making both ends of the photodiode equipotential to a node to which the photodiode and the first switching device are connected, in an idle section between two X-ray detection sections.

2. The X-ray detector of claim 1, wherein the photodiode comprises a first electrode which is electrically connected to the first switching device and a second electrode which is electrically connected to a bias line which applies a bias voltage.

3. The X-ray detector of claim 1, wherein the first switching device comprises a gate electrode which is electrically connected to a gate line, a first electrode which is electrically connected to the photodiode, and a second electrode which is electrically connected to a data line.

4. The X-ray detector of claim 2, wherein the second switching device comprises a gate electrode which is electrically connected to a first voltage line which applies a first voltage for turning on the second switching device, a first electrode which is electrically connected to a second voltage line which applies a voltage having the same level as the bias voltage, and a second electrode which is electrically connected to the node.

5. The X-ray detector of claim 1, wherein each of the plurality of light sensing pixels further comprises a third switching device which applies a voltage for maintaining a constant potential difference at both ends of the photodiode to the node, in the idle section between the two X-ray detection section.

6. The X-ray detector of claim 5, wherein the third switching device comprises a gate electrode which is electrically connected to a third voltage line which applies a third voltage for turning on the third switching device, a first electrode which is electrically connected to a fourth voltage line which applies a fourth voltage for applying a reverse bias to the photodiode, and a second electrode which is electrically connected to the node.

7. An X-ray detector comprising:
    a panel which comprises light sensing pixels arrayed in a matrix form, wherein each of the light sensing pixels comprises a photodiode which generates an electric detection signal corresponding to an emitted X-ray in an X-ray detection section and a first switching device which transmits the electric detection signal to the outside;
    a gate driver which applies a gate signal for turning on the first switching device to a gate line; and
    a second switching device which applies a voltage having the same level as a bias voltage applied to an other electrode of the photodiode, to a node to which an electrode of the photodiode and the first switching device are connected, in an idle section between two X-ray detection sections.

8. The X-ray detector of claim 7, wherein the second switching device is installed in each of the light sensing pixels.

9. The X-ray detector of claim 7, further comprising a third switching device which applies a voltage for maintaining a constant potential difference at both ends of the photodiode, to the node in the idle section between the two X-ray detection sections.

10. The X-ray detector of claim 9, wherein the third switching device is installed in each of the light sensing pixels.

11. A method of driving an X-ray detector comprising a plurality of light sensing pixels, each of which comprises a photodiode for generating an electric detection signal corresponding to an emitted X-ray and a first switching device for transmitting the electric detection signal to the outside, comprising:
    turning on the first switching device to transmit the electric detection signal to the outside in an X-ray detection section; and
    applying a voltage for making both ends of the photodiode equipotential to a node to which the photodiode and the first switching device are connected, in an idle section between two X-ray detection sections.

12. The method of claim 11, further comprising applying a voltage for maintaining a constant potential difference at the both ends of the photodiode, to the node in the idle section between the two X-ray detection sections.

13. The method of claim 11, wherein the photodiode comprises a first electrode which is electrically connected to the first switching device and a second electrode which is electrically connected to a bias line which applies a bias voltage.

14. The method of claim 11, wherein the first switching device comprises a gate electrode which is electrically connected to a gate line, a first electrode which is electrically connected to the photodiode, and a second electrode which is electrically connected to a data line.

15. The method of claim 13, wherein the voltage for making the both ends of the photodiode equipotential is applied by a second switching device which comprises a first electrode which is electrically connected to a second voltage line which applies a voltage having the same level as the bias voltage and a second electrode which is electrically connected to the node.

16. The method of claim 12, wherein the voltage for maintaining the constant potential different at the both ends of the photodiode is applied by a third switching device which comprises a first electrode which is electrically connected to a fourth voltage line which applies a fourth voltage for applying a reverse bias to the photodiode and a second electrode which is electrically connected to the node.

* * * * *